US008917615B2

(12) United States Patent
Rasanen et al.

(10) Patent No.: US 8,917,615 B2
(45) Date of Patent: Dec. 23, 2014

(54) METHOD, APPARATUS AND SYSTEM FOR DETECTING SERVICE DATA OF A PACKET DATA CONNECTION

(75) Inventors: Juha Antero Rasanen, Espoo (FI); Jorma Tapio Sarja, Espoo (FI)

(73) Assignee: Nokia Siemens Networks Oy, Espoo (FI)

(*) Notice: Subject to any disclaimer, the term of this patent is extended or adjusted under 35 U.S.C. 154(b) by 180 days.

(21) Appl. No.: 13/253,118

(22) Filed: Oct. 5, 2011

(65) Prior Publication Data

US 2012/0087262 A1 Apr. 12, 2012

(30) Foreign Application Priority Data

Oct. 6, 2010 (WO) ................. PCT/EP2010/064918

(51) Int. Cl.
*H04L 12/28* (2006.01)
*H04L 12/26* (2006.01)
*H04L 12/14* (2006.01)
*H04W 8/26* (2009.01)
*H04L 12/813* (2013.01)
*H04L 29/06* (2006.01)

(52) U.S. Cl.
CPC .......... *H04L 12/1407* (2013.01); *H04L 43/028* (2013.01); *H04L 47/20* (2013.01); *H04L 63/20* (2013.01); *H04W 8/26* (2013.01)
USPC ........................................................ 370/252

(58) Field of Classification Search
USPC .................................. 370/252, 328; 709/228
See application file for complete search history.

(56) References Cited

U.S. PATENT DOCUMENTS

2011/0280216 A1* 11/2011 Li et al. .................... 370/331
2012/0144049 A1* 6/2012 Lopez Nieto et al. ........ 709/228
2012/0243547 A1* 9/2012 Pardo-Blazquez et al. ... 370/401

OTHER PUBLICATIONS

3GPP TR23.813 V0.3.0 (Sep. 2010), "3$^{rd}$ Generation Partnership Project; Technical Specification Group Services and System Aspects; Study on Policy Solutions and Enhancements (Release 10)", 26 pgs.
3GPP TS29.212 V9.4.0 (Sep. 2010), "3$^{rd}$ Generation Partnership Project; Technical Specification Group Core Network and Terminals; Policy and Charging Control over Gx reference point (Release 9)", 115 pgs.
3GPP TS23.203 V10.1.0 (Sep. 2010), "31$^{rd}$ Generation Partnership Project; Technical Specification Group Services and System Aspects; Policy and charging control architecture (Release 10)", 132 pgs.
"3rd Generation Partnership Project; Technical Specification Group Services and System Aspects; Policy and charging control architecture (Release 9)" 3GPP Standard; 3GPP TS 23.203; 3rd Generation Partnership Project (3GPP); Mobile Competence Centre; 650, Route des Lucioles; F-06921 Sophia-Antipolis Cedex; France; No. V9.6.0, Sep. 29, 2010, pp. 1-123, XP050442316, [retrieved on Sep. 29. 2010], p. 62-p. 63.

(Continued)

*Primary Examiner* — Michael Thier
*Assistant Examiner* — Yaotang Wang
(74) *Attorney, Agent, or Firm* — Harrington & Smith

(57) ABSTRACT

The invention relates to an apparatus, a system, a method and a computer program product for transmitting to a policy and/or charging server information relating to a user, wherein the information includes an indication of a service data detecting entity for detecting service data of a packet data connection of the user, and initiating communication towards the service data detecting entity based on the received information.

18 Claims, 5 Drawing Sheets

(56) References Cited

OTHER PUBLICATIONS

Nokia Siemens Networks: "Key issue 4: Roles of standalone TDF and PCRF"; 3GPP Draft; S2-104941; 3rd Generation Partnership Project (3GPP); Mobile Competence Centre; 650, Route des Lucioles; F-06921 Sophia-Antipolis Cedex; France; vol. SA WG2, No. Prague; 20101011, Oct. 6, 2010, XP050459723, [retrieved on Oct. 6, 2010], the whole document (4 pages).

* cited by examiner

METHOD, APPARATUS AND SYSTEM FOR DETECTING SERVICE DATA OF A PACKET DATA CONNECTION

TECHNICAL FIELD OF THE INVENTION

The present invention relates to a mechanism for controlling a communication connection. In particular, the present invention is related to a method, a system and apparatus for transmitting to a policy and/or charging server information indicating a service data detecting entity for detecting service data of a packet data connection.

BACKGROUND OF THE INVENTION

Policy control architecture has been defined by 3rd Generation Partnership Project (3GPP). Policy elements can maintain information on active packet connections of users and about packet gateways via which the packet connections traverse.

Traffic detection function (TDF), based on packet inspection, can be applied in a network to support policy and charging control for services for which the policy and charging control function (PCRF) does not get related service information from an application function (AF) or proxy call state control function (P-CSCF).

A standalone TDF is not able to identify the establishment of a packet data connection, because the GPRS tunneling protocol (GTP) operates between the PCEF and the access network and is consequently not seen by the standalone TDF.

SUMMARY OF THE INVENTION

The present invention overcomes above drawbacks by providing an apparatus, a method and a computer program product comprising establishing a packet data connection for a user, and, transmitting to a policy and/or charging server information relating to the user, wherein the information can comprise an indication of a service data detecting entity for detecting service data of the packet data connection.

The information can comprise at least one of an internet protocol address of the user and an identity of the user. The indication can comprise an address of the service data detecting entity (TDF).

The apparatus can be a packet data gateway and/or a policy enforcement function.

Further, an apparatus, a method and a computer program are provided comprising receiving information relating to a user, wherein the information can comprise an indication of a service data detecting entity for detecting service data of a packet data connection of the user, and, initiating communication towards the service data detecting entity based on the received information.

The information relating to the user can comprise at least one of an internet protocol address of the user and an identity of the user and the initiating can includes transmitting the information to the service data detecting entity (TDF).

The communication can comprise a control session for the user between the service data detecting entity (TDF) and the apparatus, and the control session can comprise receiving service information relating to detected service data of the packet data connection of the user.

The service information can comprise an indication on the start or the stop of the service.

The control session can comprise transmitting to the service data detecting entity (TDF) instructions for detecting service data of the packet data connection of the user The communication can comprise transmitting a request to establish a control session for the user.

The communication can comprise transmitting to the service data detecting entity (TDF) a contact address of the apparatus to enable the service data detecting entity (TDF) to establish a control session for the user based on the contact address.

Further, an apparatus, a method and a computer program are provided comprising detecting service data of a packet data connection of a user, and, receiving from a policy and/or charging server (PCRF) a request to initiate a control session for the user between the policy and/or charging server (PCRF) and the apparatus, wherein the control session can comprise reporting service information to the policy and/or charging server (PCRF) based on service data detected on the packet data connection of the user.

The request to initiate can comprise at least one of an internet protocol address of the user, an identity of the user, instruction for service detection, packet data connection identity and a contact address of the policy and/or charging server (PCRF).

The service information can comprise an indication on the start or the stop of the service.

The request can comprise the policy and/or charging server (PCRF) establishing the control session with the apparatus, or, a request that the apparatus establish the control session with the policy and/or charging server (PCRF).

The control session can comprise receiving from the policy and/or charging server (PCRF) instructions for detecting service data of the packet data connection of the user.

Further, a system, a method and a computer program are provided, comprising transmitting to a policy and/or charging server information relating to a user, wherein the information can comprise an indication of a service data detecting entity for detecting service data of a packet data connection of the user, and transmitting, by the policy and/or charging server, to the indicated service data detecting entity a request to initiate detection of service data of the packet data connection of the user.

The request and/or the information relating to the user can comprise at least one of:
  an internet protocol address of the user,
  an identity of the user,
  instruction for service detection,
  packet data connection identity, and,
  a contact address of the policy and/or charging server (PCRF).

The request can comprise a request to initiate a control session for the user between the policy and/or charging server and the service data detecting entity, and the control session can comprise reporting service information to the policy and/or charging server based on service data detected on the packet data connection of the user.

The request can comprise the policy and/or charging server (PCRF) establishing the control session with the apparatus, or, a request that service data detecting entity is to establish the control session with the policy and/or charging server (PCRF).

Embodiments of the present invention may have one or more of following advantages: The standalone TDF can recognize the attachment of the UE and establishment of an IP-CAN session/a default context in time before the actual user data transmission starts on the user plane, establish a control session with the PCRF and get service detection rules (SD rules) and possible policy rules (PCC rules), and thus avoid possible clipping of user data.

The standalone TDF is able to find the correct PCRF, i.e. the same PCRF as the PCEF (and BBERF, if applicable).

The standalone TDF can get additional information, like the UE IP address(es) and/or the user ID and PDN ID, which is essential e.g. for the following operations:

To support multiple simultaneous PDN connections of the same UE, the PDN ID is needed in addition to UE IP address/user ID to allow TDF to separate different PDN sessions of the same UE.

In case there is NAT between PCEF and TDF, the UE's local and global IP address are needed in TDF. Local IP address may be needed for PCRF selection and global IP address is needed for traffic detection.

In most implementations the PCEF use UE ID for PCRF selection.

DETAILED DESCRIPTION OF THE INVENTION

Figure 1:
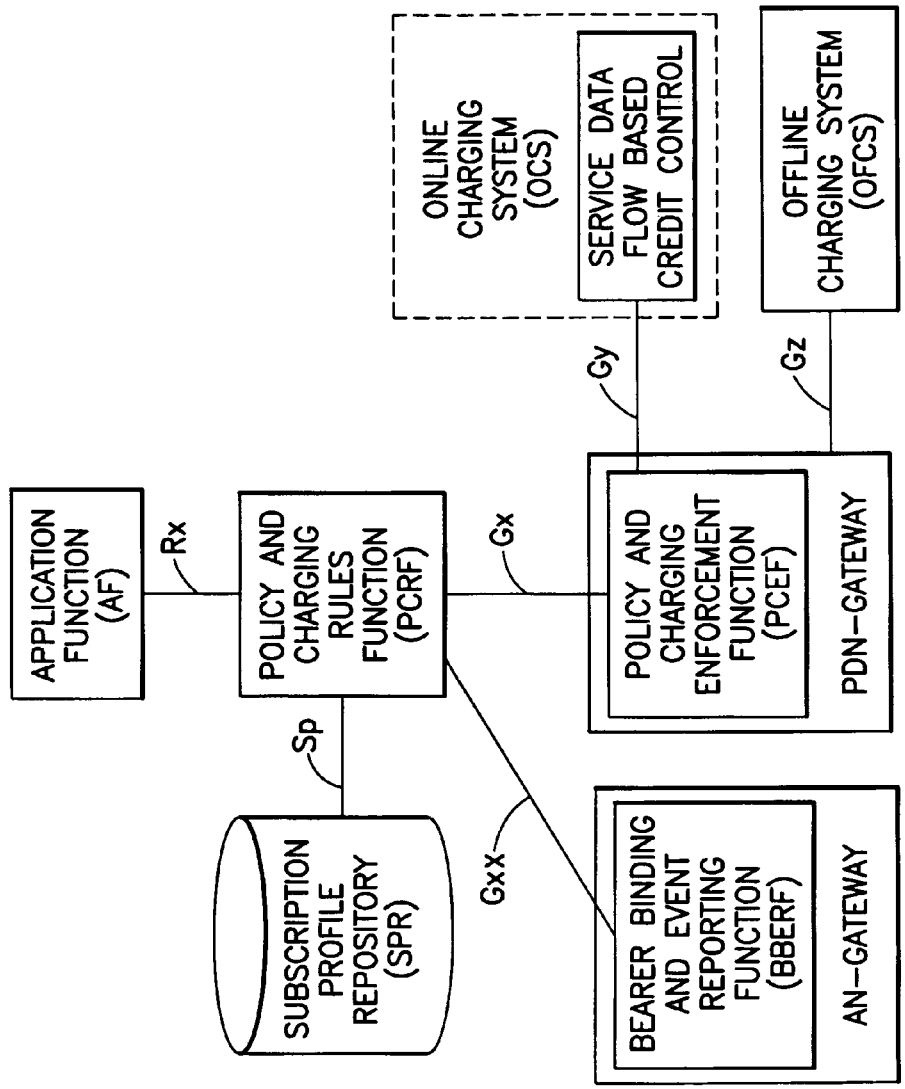
FIG. 1 illustrates Gx Reference model relevant for aspects of the invention.

IP-Connectivity Access Network (IP-CAN) refers to the collection of network entities and interfaces that provides the underlying IP transport connectivity between the UE and the IMS entities. For example, a GPRS network can be used as an IP-connectivity access network.

IP flow is a unidirectional flow of IP packets with the same source IP address and port number and the same destination IP address and port number and the same transport protocol.

IP-CAN session is an association between a UE and an IP network. The association can be identified by one or more UE IPv4 addresses/and/or IPv6 prefix together with a UE identity information, if available, and a PDN represented by a PDN ID (e.g. an access point name (APN)). An IP-CAN session can incorporate one or more IP-CAN bearers. Support for multiple IP-CAN bearers per IP-CAN session is IP-CAN specific. An IP-CAN session exists as long as the related UE IPv4 address and/or IPv6 prefix are assigned and announced to the IP network.

Serving GPRS support node (SGSN) is a GPRS support node in the IP-CAN that serves GPRS mobile stations by sending or receiving packets via a base station subsystem or a radio access network. SGSN is the basic element of the GPRS infrastructure. It stores for each mobile in its context different parameters used to route the packets, for example information about the mobile's location.

Gateway GPRS support node (GGSN) acts as a gateway between the GPRS network and packet-switched public data network (PSPDN). For the packet-switched public data network, the GPRS network resembles a subnetwork which can transfer data to or from a GPRS mobile station. The GGSN can hide the operation of the GPRS network from the packet-switched public data network through the encapsulation of packets. From the external network's point of view, the gateway GPRS support node is simply a router to a subnetwork.

GPRS Tunneling Protocol (GTP) is a protocol that is used in the GPRS for transmitting user data packets and signalling between GPRS support nodes (GGSN, SGSN) over GPRS backbone network.

Policy and charging rules function (PCRF) is a function that defines and provides the policy and charging rules that are used in the policy enforcement points for policy control and flow-based charging control. The PCRF has been developed for the 3GPP Release 7 and it combines the charging rules with the policy decision function of earlier 3GPP architecture releases. PCRF can maintain IP-CAN session associated with users.

Policy and charging enforcement function (PCEF) is a function that receives the policy and charging rules from the PCRF, detects traffic, and enforces the rules for classifying the traffic on service data flows. The control for the quality of service (QoS) is applied per service data flow in the PCEF. The PCEF can be co-located in a packet data network (PDN) gateway.

Gx reference point is the reference point between a packet data network (PDN) gateway and a PCRF. The Gx reference point can be used to transfer the policy and charging information from the PCRF to the PCEF located in the PDN gateway.

Policy and Charging Control (PCC) rules can be used to:
 detect that a packet belongs to a service data flow.
 downlink IP CAN bearers can be selected based on service data flow filters within the PCC rule
 Service data flow filters can be used for the enforcement that uplink IP flows are transported in the correct IP CAN bearer.
 identify a service to which the service data flow contributes to.
 provide charging parameters for a service data flow.
 provide quality of service (QoS) and policy control for a service data flow.

The PCEF can select a PCC rule for each received packet by evaluating received packets against service data flow filters of PCC rules in the order of the precedence of the PCC rules. When a packet matches a service data flow filter, the packet matching process for that packet can be completed, and the PCC rule for that filter shall be applied.

As part of PCC procedures, an IP-CAN session associated with an user can be established. The PCRF can select a bearer control mode that will apply for the IP-CAN session and provide it to the PCEF via the Gx reference point.

The PCRF can indicate PCC rules to be applied at the PCEF in two ways over the Gx reference point:

1.) In pull procedure a PCC rule is requested by the PCEF. In response to a request for PCC rules being made by the PCEF, the PCRF can provision PCC rules, for example in a CC-Answer diameter message.

2.) In push procedure the PCRF can decide to provision PCC rules without obtaining a request from the PCEF, for example, responsive to information provided to the PCRF from an application function (AF) over Rx reference point (FIG. 1), or based on an internal trigger within the PCRF. When provisioning PCC rules without a request from the PCEF, the PCRF can include the PCC rules in an RA-Request Diameter message.

Bearer Binding and Event Reporting Function (BBERF) is a functional element located in an S-GW. It can provide control over the user plane traffic handling. The BBERF can be located in an access network (AN) gateway (GW).

Gateway Control Session is an association between a BBERF and a PCRF, used for transferring access specific parameters, BBERF events and QoS rules between the PCRF and BBERF.

Attribute-value pair (AVP) is a generic pair of values that consists of an attribute header and the corresponding value. The AVP can be used to encapsulate protocol-specific data such as routing information, as well as authentication, authorisation, or accounting information. Diameter protocol can carry information using AVPs. Gx reference point can transfer information using AVPs.

A PCEF and a PCRF can indicate supported features on the Gx reference point. Supported-Features AVP can be used during session establishment to inform the destination host (PCEF/PCRF) about the required and optional features that the origin host supports. The sender (client) can in the first request in a Diameter session indicate the set of features required for the successful processing of the session. If there are features supported by the client that are not advertised as part of the required set of features, the client can provide in the same request this set of optional features that are optional for the successful processing of the session. The receiver of the first Supported-Features AVP (server) can in the first answer within the Diameter session indicate the set of features that it has in common with the client and that the server can support within the same Diameter session. Any further command messages can be compliant with the list of supported features indicated in the Supported-Features AVPs and features that are not indicated in the Supported-Features AVPs during session establishment. Features that are not advertised as supported may not be used to construct the command messages for that Diameter session.

When there is no interaction between a policy function and an application and/or session level entity, such as application function (AF), the network may not be aware of the usage of a service by UE even though the network may have defined policies related to the service. User experience can be enhanced, if the network becomes aware of such services and the network is able to apply service specific policies.

Traffic detection function (TDF), based on deep packet inspection, can be applied in a network to support policy and charging control (by PCRF) for services for which the PCRF does not get related service information from an AF/P-CSCF. Such conditions may occur for example when the AF does not have an interface to the PCRF (refer to the Rx interface between AF/P-CSCF and PCRF) or when there is no explicit service level signalling and hence no interaction between the AF and PCRF or when filters related to a service has not been installed in the PCEF.

The TDF can indicate the start and stop of the detected services to the PCRF. The PCRF can provision, modifies and/or delete PCC rules for the detected service. The use of the service traffic detection mechanism may be combined with privacy policies, in other words, the PCRF can check upon an IP-CAN session establishment whether the use of the traffic detection mechanism is allowed for a given user, and if yes, which services shall be monitored and detected. The PCRF can then instruct the TDF on which services it should detect and report.

Considering the traffic detection for policy and charging control purposes, the traffic detection functionality can be implemented either as co-located with PCEF or as a standalone entity. The standalone solution can aim at avoiding performance and scalability problems that may occur in a solution where the traffic detection is integrated in the same entity/gateway with the PCEF.

The use of the service traffic detection mechanism can require user/subscriber consent, and for this purpose the PCC architecture can be extended to include user privacy policies (e.g. the PCRF can check the subscription data in a subscription profile repository (SPR) upon an IP-CAN session establishment, if the PCEF indicates the support of the traffic detection function). Gx and Rx based interfaces can be used for the interface between the PCRF and TDF.

When TDF and PCEF are collocated, the Gx based solution can be an extension to the current Gx interface/protocol and an Rx based solution can mean an extra Rx based protocol (in addition to Gx) between the TDF/PCEF and PCRF. A standalone TDF can mean a new (possibly Gx or Rx based) protocol between the standalone TDF and PCRF.

Some policy enforcement related actions, for example, gating, shaping and redirection, can be activated at the TDF after the detection of a given service. Normally these enforcement actions can be performed by the PCEF.

A standalone TDF may not be able to identify the establishment of the default context/IP-CAN session, because the (GTP) protocol operates between the PCEF and the access network and can consequently not be seen by the standalone TDF. The TDF can recognize the attach of the UE and establishment of a default context only when the first application packet is detected at the TDF. This can be too late for establishing a control session with the PCRF and too late for getting service detection rules (and possible PCC rules) from the PCRF.

A standalone TDF is not able to find the correct PCRF, meaning the same PCRF as the PCEF (and BBERF, if applicable), because the TDF can not get all the required information from the detected application packets, i.e. the UE IP address(es) and/or the user ID and PDN ID.

Additional information can be needed for following reasons:
  To support multiple simultaneous PDN connections of the same UE, the PDN ID can be needed in addition to UE IP address/user ID to allow the TDF to separate different PDN sessions of the same UE.
  In case there is a network address translator (NAT) located between the PCEF and the TDF, the UE's local and global IP address can be needed in the TDF. The local IP address can be needed for the PCRF selection and the global IP address can be needed for the traffic detection.
The PCEF can use UE ID for the PCRF selection.

The PCEF can obtain this information upon the default context/IP-CAN session establishment.

Figure 4:
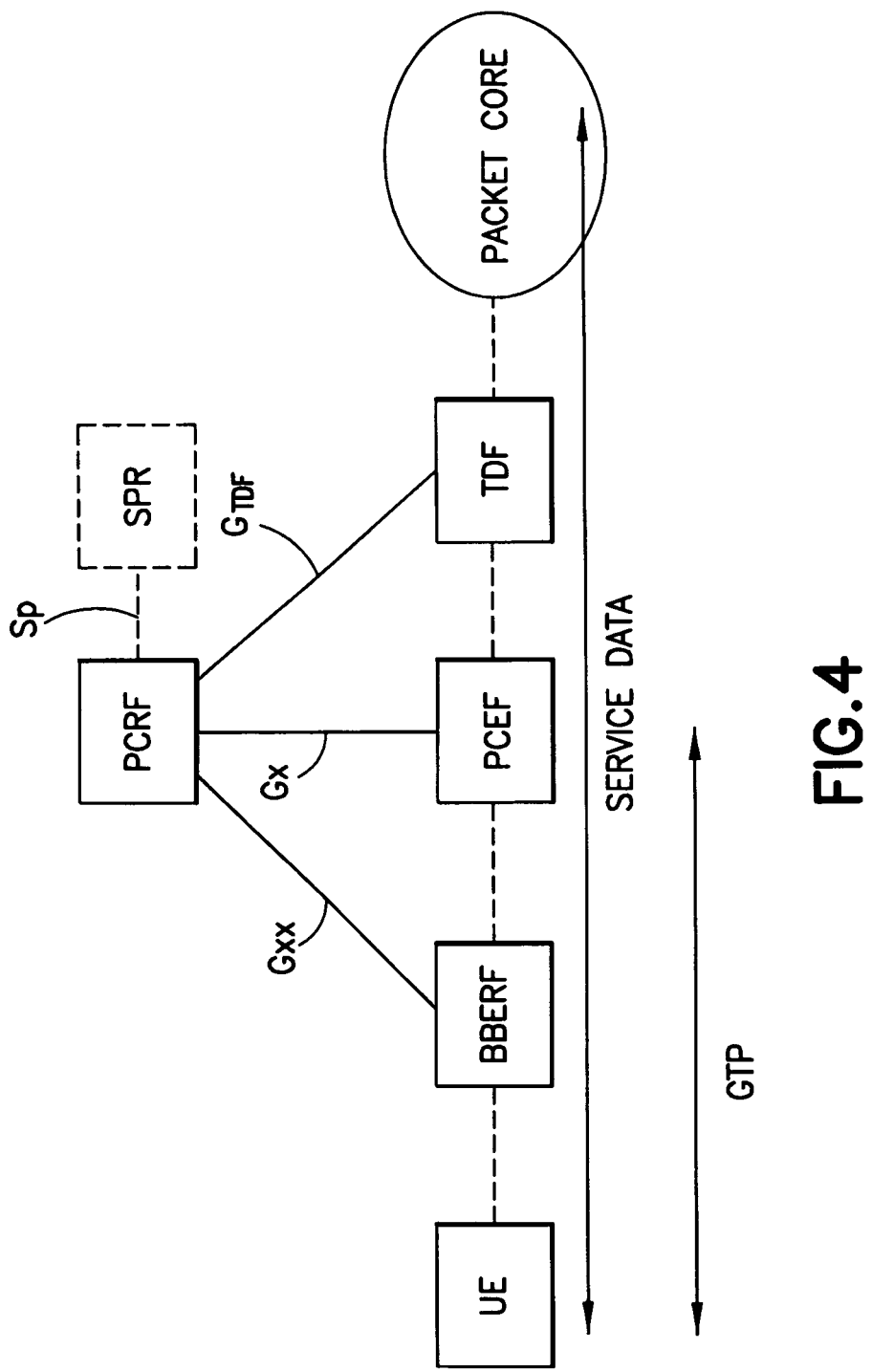
FIG. 4 illustrates network elements, GTP and service data path relevant for aspects of the invention.

FIGS. 1 and 4 show architecture and network elements relevant for policy and charging control. In FIG. 4, as can be seen, the GTP is established between the UE and the PCEF through the access network, however, the TDF is not involved in this and thereby cannot directly detect user plane activity. Only later, when a first use plane packet is transmitted, shown as "service data" in FIG. 4, the TDF can detect user plane activity. However, at this phase it can be too late for the TDF to establish a control session and obtain instructions (rules) to detect service traffic of the user since data is already transmitted.

According to an aspect of the invention, when a UE attaches the network and a packet data connection default context is established between the UE and the P-GW/PCEF and the PCEF can establishes a (Diameter) control session to the PCRF, the PCEF can send an IP address/contact information of the relevant TDF to the PCRF (in addition to the regular other parameters like UE IP address and user ID, etc.).

According to an aspect of the invention, the PCRF can use the IP address/contact information of the TDF to contact the TDF for a control session establishment for the: identified user/UE.

According to an aspect of the invention, the PCRF can send the UE IP address(es), user ID, PDN ID and possibly other parameters to the TDF. The PCRF can also indicate the contact IP address the TDF can use towards the PCRF. This information can be exchanged using a common/auxiliary (Diameter) session, i.e. a (Diameter) session not dedicated to any specific user session.

A session can be established, for example, when the first need between the PCRF and TDF appears or when the PCEF and TDF start up. Such a session can alternatively be established every time there is a need for it and deleted after that.

According to an aspect of the invention, the TDF can use the UE IP address(es), user ID, PDN ID and possible other parameters for establishing a user/UE specific (Diameter) control session towards the PCRF that contacted the TDF.

With the information received from the PCRF, the TDF can operate in a currently standardized way (standardized for PCEF, BBERF) as a Diameter client, and the TDF can end up using the same PCRF as the PCEF. Consequently, an extended Gx protocol with minimal changes can be applied to the interface between the TDF and the PCRF.

Figure 2:
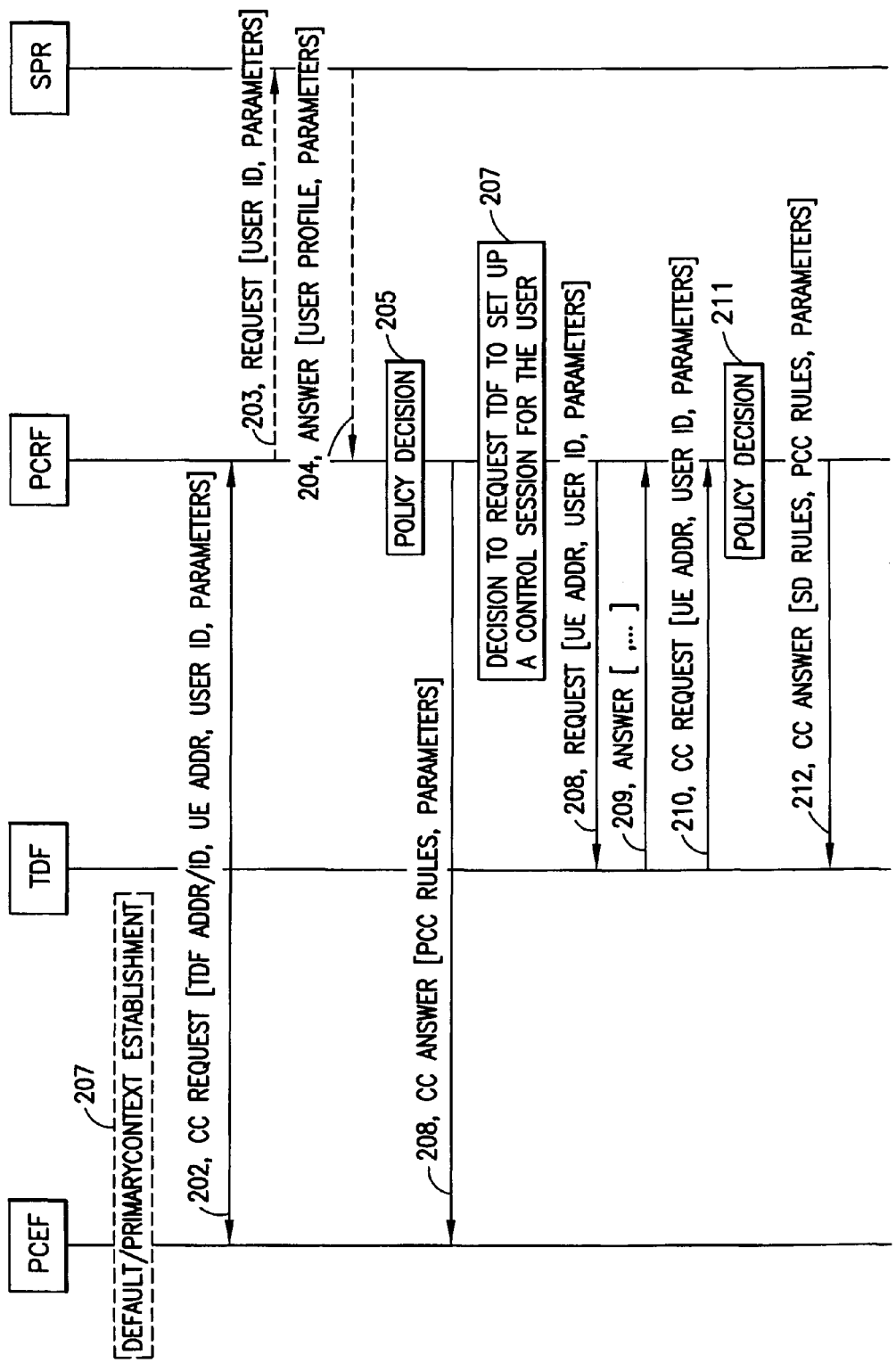
FIGS. 2 and 3 illustrate message flows according to aspects of the invention.

In the following, an example signalling flow is explained with help of FIG. 2. In 201, a UE can attach the network and a default context (GTP) can be established between the UE and P-GW/PCEF. In 202, the PCEF can establish a (Diameter) control session to the PCRF, the PCEF can send the IP address/contact information of the relevant TDF to the PCRF (in addition to the regular other parameters like UE IP address and user ID, etc.). In 203, the PCRF can request the user profile from a user/subscription register (SPR). In 204, the PCRF can receive the user profile from the register. The user profile can include e.g. service detection rules (SD Rules) to be used for traffic detection by the TDF. The user profile can include other parameters to be used for policy decision by the PCRF. In 205, the PCRF can make a policy decision, e.g. create PCC rules. In 206, the PCRF can send the PCC rules and possible other parameters to the PCEF. In 207, the PCRF can make a decision to request the TDF to establish a (Diameter) control session for the identified user/UE. In 208, the PCRF can send to the identified TDF a request for the TDF to establish a (Diameter) control session to the PCRF for the identified user/UE. In 209, the TDF can acknowledge the request. On 210, the TDF can send a request (CC Request) to establish a (Diameter) control session to the PCRF for the identified user/UE. In 211, the PCRF can make a policy decision based on the request and on the information retrieved earlier from the SPR for the user. The policy decision can comprise SD rules, PCC rules and possible other parameters. In 212, the PCRF can send the SD rules, possible PCC rules and possible other parameters to the TDF.

According to another aspect of the invention, the PCRF can operate as a (Diameter) client and can establish a user/UE specific (Diameter) control session towards the TDF. The PCRF can send service detection rules and possible PCC rules (and other relevant parameters) in the initial message/command to the TDF. This alternative does not require any auxiliary session established by the PCRF towards the TDF, but on the other hand, this solution changes the client vs. server roles of the TDF and PCRF.

Figure 3:
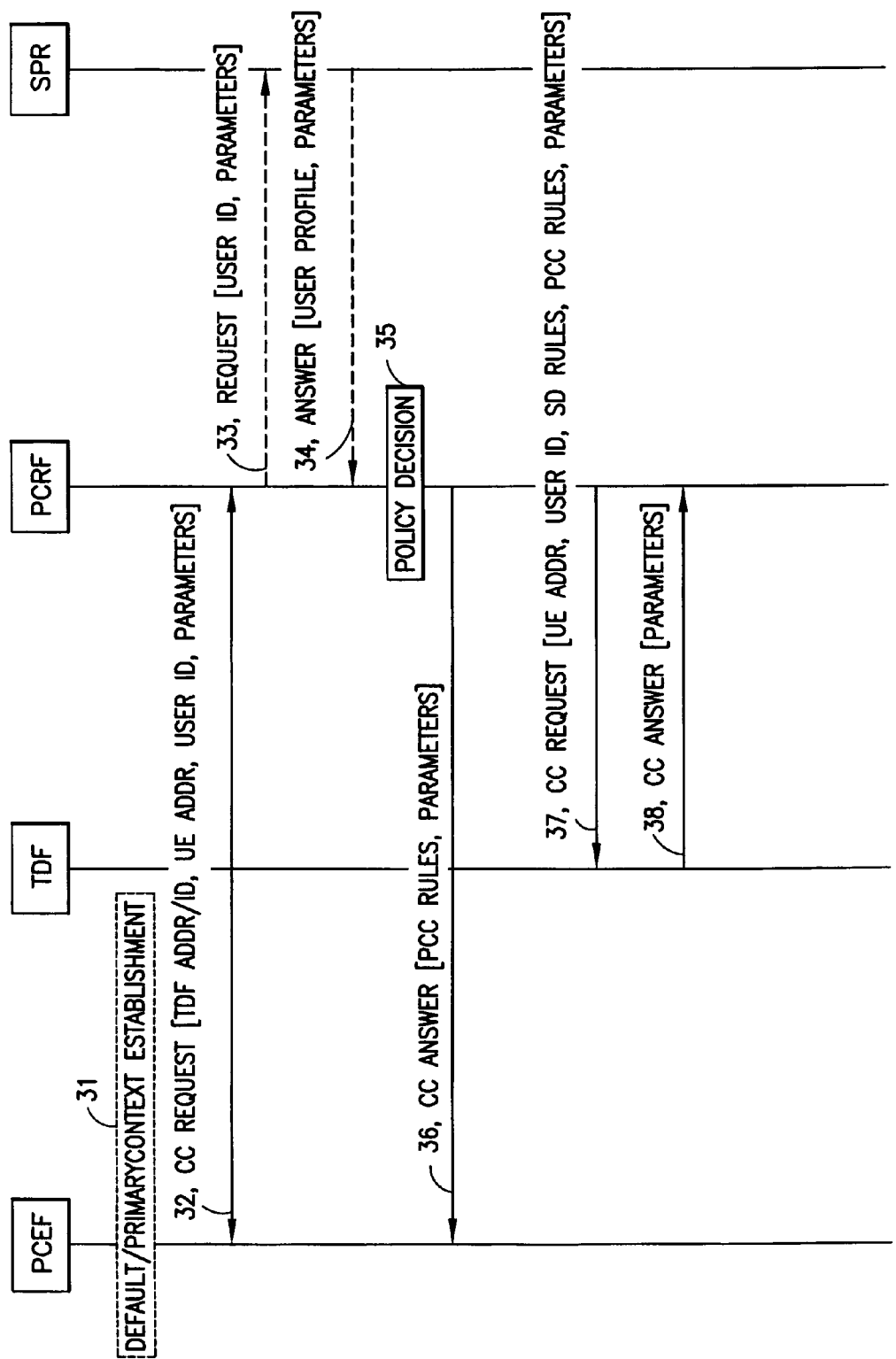

In the following, an example signalling flow is explained with help of FIG. 3. In 31, a UE can attach the network and a default context can be established between the UE and P-GW/PCEF. In 32, the PCEF can establish a (Diameter) control session to the PCRF, the PCEF sends the IP address/contact information of the relevant TDF to the PCRF (in addition to the regular other parameters like UE IP address and user ID, etc.). In 33, the PCRF can request the user profile from a user/subscription register (SPR) and in 34 the PCRF can receive the user profile from the register. The user profile can include e.g. service detection rules (SD Rules) to be used for traffic detection by the TDF. The user profile may include other parameters to be used for policy decision by the PCRF.

In 35, the PCRF can make a policy decision, e.g. create PCC rules. In 36, the PCRF can send the PCC rules and possible other parameters to the PCEF. In 37, the PCRF can send a request (CC Request) to establish a (Diameter) control session to the TDF for the identified user/UE. The request may include SD rules, PCC rules and possible other parameters. In 38, the TDF can acknowledge the request.

According to an aspect of the invention, a PCEF/P-GW can send an IP address/contact information of a related TDF as a new parameter to the PCRF in the initial CC Request. PCRF can use the IP address/contact information of the TDF to establish a control session towards the TDF.

Figure 5:
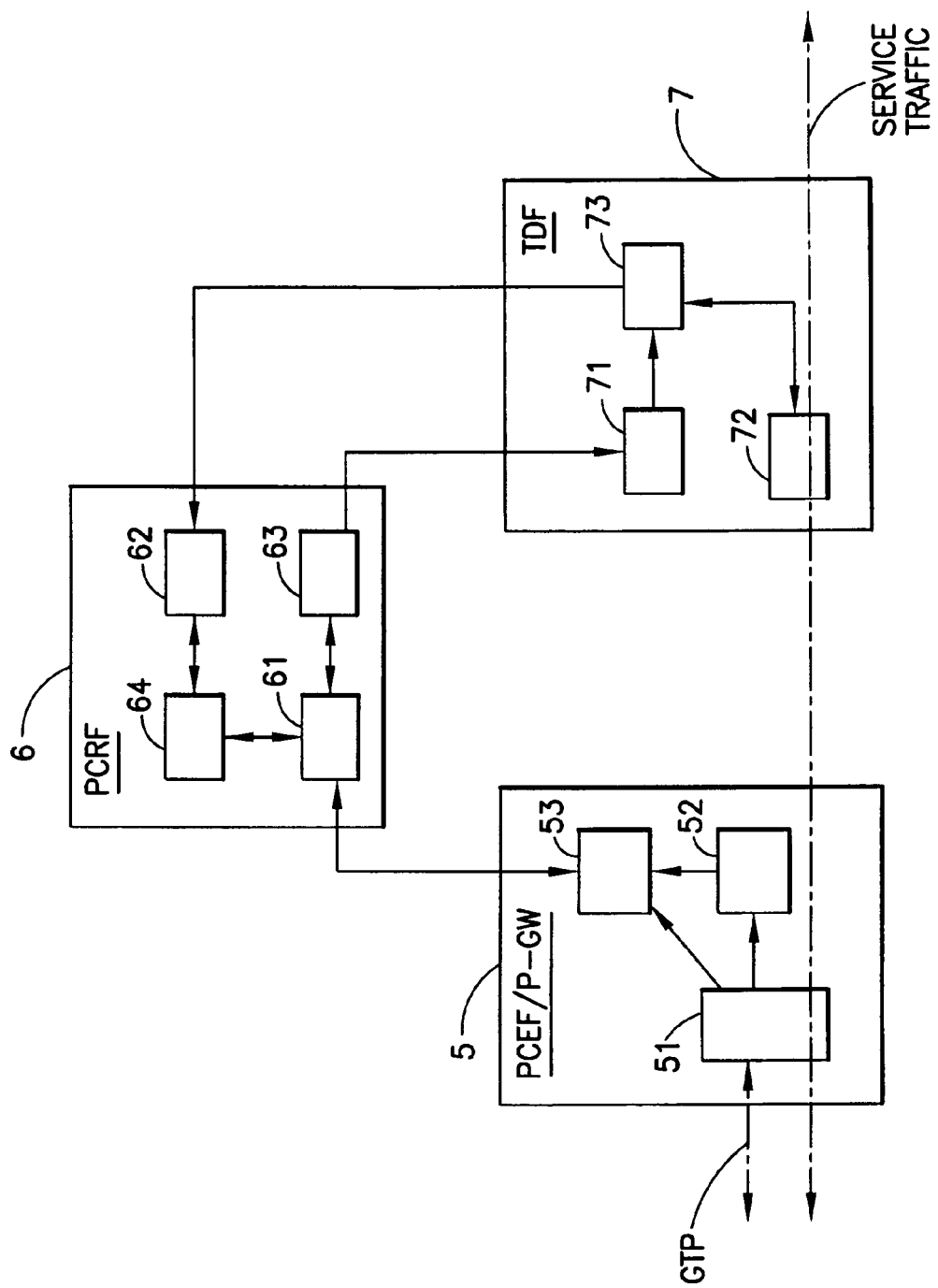
FIG. 5 illustrates an example structure and functions of an apparatuses implementing aspects of the invention.

FIG. 5 illustrates an example internal structure and functions of apparatuses implementing aspects of the invention. An apparatus 5, which can be a PCEF and/or a packet data gateway, has a packet data unit 51 which can be configured to establish a packet data network (PDN) connection towards a UE. The PDN connection can be a PDP context, primary and/or default context and can be established according to GTP protocol. The apparatus 5 can have storage unit 52 configured to store network configuration information, for example addresses of various network elements. The storage unit 52 can store an indication (e.g. IP address) of a service data detecting entity 7, such as TDF 7, which can be responsible for service traffic detection for users of the network. A policy unit 53 can be configured communicate with a policy server 6, for example over Gx interface according to Diameter protocol. The policy unit 53 can perform various Qos, charging and policy related tasks independently and/or based on instructions (PCC e.g. rules) received from the policy server 6. The policy unit 53 can decide to involve a TDF 7 to monitor, analyze and/or detect service traffic of the UE on a PDN connection established by the packet data unit 51. The policy unit 53 can interface the storage unit 52 and can be configured to transmit the IP address of the TDF 7 to the policy server 6.

An apparatus 6, for example a policy server (PCRF), can have a policy signaling unit 61 configured to receive and transmit QoS, policy control and/or charging related information to and from another entity 5, for example, to an from a packet data gateway 5. The policy signaling unit 61 can operate over Gx interface according to Diameter protocol. The apparatus 6 can have a rules unit 64 configured to maintain instructions (PCC rules) relating to QoS, charging and policy control. The instructions can be user specific. The rules unit 64 can be configured to communicate with an external subscription repository (SPR) (shown in FIG. 1) to retrieve user specific information, for example subscription profiles. The policy signaling unit 61 can instruct the packet data gateway 5 to control and enforce the UE connection according to PCC rules stored in the rules unit 64. The policy signaling unit 61 can be configured to receive an indication (IP address) of a service data detecting entity 7, such as TDF 7, which can be responsible for service traffic detection for the connection established for the UE through the packet data gateway 5 and the TDF 7. The apparatus 6 can have a transmitting unit 63 configured to transmit to the indicated TDF 7 (based on the IP address received by the policy signaling unit 61) a request that a service traffic of the UE can/should be detected. The transmitting unit 63 can also transmit other relevant information to the TDF 7 to enable service traffic detection to be initiated, for example, an identity of the user, IP addresses relating to the connection to be detected, PDN ID etc, and/or an IP address of the apparatus 6 itself to allow the TDF 7 to establish a control session for traffic detection with the apparatus 6. A control session unit 62 can be configured to establish a control session for service traffic detection with the TDF 7. The control session unit 62 can receive from the TDF 7 information, for example events, relating to services detected on the service traffic of the user, for example, an indication of the start and/or stop of a specific service. The control session unit 62 can transmit the received information to other units of the apparatus 6, and can store the information for later use. The control session unit 62 can be configured to receive a request to establish a control session from the TDF 7. Alternatively or in addition, the control session unit 62 can be configured to transmit a request to the TDF 7 to initiate a control session. Alternatively or in addition, the transmitting unit 63 can transmit a request to establish a control session when being in contact with the TDF 7. The control session can be a Diameter session and the control session unit 62 can be configured to act as a Diameter client or Diameter server depending on which element (PCRF 6, TDF 7) initiates the control session.

An apparatus 7, for example a service data detecting entity 7, such as TDF 7, can have a traffic detection unit 72 configured to monitor, analyze and/or detect services in a packet data flow of a user. The traffic detection unit 72 can detect, for example, the start or stop of a specific service based on characteristics of the data traffic. The traffic detection unit 72 can receive instructions, for example service detection rules and filters, on how to detect services from a control session unit 73, which in turn can be configured to received the instruction from another apparatus (PCRF 6), for example during a control session or as a standalone signalling message. The apparatus 7 can have a receiving unit 71 configured to receive information relating to initiation of a control session with a PCRF 6. The information can contain an IP address of the PCRF 6, identity of the user whose traffic is to be detected, necessary IP addresses to detect the traffic and/or PDN ID. The control session unit 73 can be configured to establish a control session for service traffic detection with the PCRF 6. The control session unit 73 can receive from the traffic detection unit 72 information, for example events, relating to services detected on the service traffic of the user, for example, an indication of the start and/or stop of a specific service which the control session unit 73 can transmit to the PCRF 6. The control session unit 73 can be configured to receive a request to establish a control session from the PCRF 6. Alternatively or in addition, the control session unit 73 can be configured to transmit a request to the PCRF 6 to initiate a control session. Alternatively or in addition, the receiving unit 71 can receive a request to establish a control session when being in contact with the PCRF 6. The control session can be a Diameter session and the control session unit 73 can be configured to act as a Diameter client or Diameter server depending on which element (PCRF 6, TDF 7) initiates the control session.

All units described above in relation to FIG. 5 may be implemented for example using microprocessors, chips and/or other electrical components and/or by software.

According to an aspect of the invention, a PCEF/P-GW indicates some logical TDF identifier to a PCRF and the PCRF can map the identifier to the real TDF address based on PCRF's internal mapping table.

According to an aspect of the invention, a PCEF/P-GW does not indicate the TDF to a PCRF, but instead the PCRF performs the TDF selection and indicates the selected TDF with necessary address information back to the PCEF/P-GW, based on which the PCEF/P-GW can route a PDN connection of the user to the correct TDF.

According to an aspect of the invention, instead of GTP a Proxy Mobile IP (PMIP) can be used. PMIT is a version of Mobile IP (MIP) that allows the movement of the mobility control from the mobile node to a proxy in the network.

A packed data gateway establishing a packet data connection can be any type of packet data node, for example, a PCEF/P-GW, GGSN, packet data gateway (PDG).

A packet gateway entity, service data determination entity and a policy entity may be physically implemented in a switch, router, server or other hardware platform or electronic equipment which can support data transmission and processing tasks, or can be implemented as a component of other existing device.

For the purpose of the present invention as described herein above, it should be noted that

- an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,

- usable access networks may be any device, apparatus, unit or means by which a station, entity or other user equipment may connect to and/or utilize services offered by the access network; such services include, among others, data and/or (audio-) visual communication, data download etc.;

- a user equipment may be any device, apparatus, unit or means by which a system user or subscriber may experience services from an access network, such as a mobile phone, personal digital assistant PDA, or computer;

- method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

- generally, any method step is suitable to be implemented as software or by hardware without changing the idea of the invention in terms of the functionality implemented;

- method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention claimed is:

1. An apparatus comprising:
one or more processors; and
one or more memories including computer program code, the one or more memories and the computer program code configured, with the one or more processors, to cause the apparatus to perform at least the following:
establishing a packet data connection for a user,
establishing a control session between a policy and/or charging server for the user packet data connection and the apparatus,
transmitting to the policy and/or charging server information relating to the user via the established control session after establishing the user packet data connection, wherein the information comprises an address of a service data detecting entity for detecting service data of the packet data connection, and
receiving a policy decision from the policy and/or charging server.

2. The apparatus of claim 1, wherein the information further comprises at least one of an internet protocol address of the user and an identity of the user.

3. The apparatus of claim 1, wherein the apparatus comprises at least one of a packet data gateway and a policy enforcement function.

4. An apparatus comprising:
one or more processors; and
one or more memories including computer program code, the one or more memories and the computer program code configured, with the one or more processors, to cause the apparatus to perform at least the following:
establishing a control session between a policy enforcement function or a packet data gateway and the apparatus,
receiving information relating to a user via the established control session from the policy enforcement function or the packet data gateway, wherein the information comprises an address of a service data detecting entity for detecting service data of an existing packet data connection of the user, wherein the existing packet data connection is established between the user and the policy enforcement function or the packet data gateway,
initiating communication towards the service data detecting entity based on the received information, and
transmitting a policy decision to the policy enforcement function or the packet data gateway.

5. The apparatus of claim 4, wherein the information relating to the user further comprises at least one of an internet protocol address of the user and an identity of the user and wherein the information is transmitted to the service data detecting entity.

6. The apparatus of claim 4, wherein the communication comprises a second control session for the user between the service data detecting entity and the apparatus, wherein the second control session comprises receiving service information relating to detected service data of the packet data connection of the user.

7. The apparatus of claim 6, wherein the service information comprises an indication on the start or the stop of the service.

8. The apparatus of claim 6, wherein the second control session comprises transmitting to the service data detecting entity instructions for detecting service data of the packet data connection of the user.

9. The apparatus of claim 4, wherein the communication comprises transmitting a request to establish a second control session for the user.

10. The apparatus of claim 4, wherein the communication comprises transmitting to the service data detecting entity a contact address of the apparatus to enable the service data detecting entity to establish a second control session for the user based on the contact address.

11. A method comprising:
establishing a control session between a policy enforcement function or a packet data gateway and a policy and/or charging server,
transmitting, by the policy enforcement function or the packet data gateway, to the policy and/or charging server information relating to a user via the established control session, wherein the information comprises an address of a service data detecting entity for detecting service data of an existing packet data connection of the user, wherein the existing packet data connection is established between the user and the policy enforcement function or the packet data gateway, and
transmitting, by the policy and/or charging server, to the indicated service data detecting entity a request to initiate detection of service data of the existing packet data connection of the user;
wherein the method further comprises:
transmitting, by the policy and/or charging server, a policy decision to the policy enforcement function or the packet data gateway.

12. The method of claim 11, wherein at least one of the request and the information relating to the user comprises at least one of:
an internet protocol address of the user, an identity of the user, instruction for service detection, packet data connection identity, and a contact address of the policy and/or charging server.

13. The method of claim 11, wherein the request comprises a request to initiate a second control session for the user between the policy and/or charging server and the service data detecting entity, and wherein the second control session comprises reporting service information to the policy and/or charging server based on service data detected on the packet data connection of the user.

14. The method of claim 11, wherein the request comprises the policy and/or charging server establishing a second control session with the service data detecting entity, or a request that the service data detecting entity is to establish a second control session with the policy and/or charging server.

15. A computer program product comprising a non-transitory computer-readable storage medium bearing computer program code embodied therein for use with a computer, the computer program code comprising code for performing the method of claim 11.

16. A method comprising:
   establishing a packet data connection for a user, wherein the packet data connection is established between the user and a policy enforcement function or a packet data gateway, and
   establishing a control session between the policy enforcement function or the packet data gateway and a policy and/or charging server,
   transmitting, by the policy enforcement function or the packet data gateway, to the policy and/or charging server via the established control session after establishing the user packet data connection, information relating to the user, wherein the information comprises an address of a service data detecting entity for detecting service data of the packet data connection;
   wherein the method further comprises:
   receiving, by the policy enforcement function or the packet data gateway, a policy decision from the policy and/or charging server.

17. A method comprising:
   establishing a control session between a policy and/or charging enforcement function or a packet data gateway and a policy and/or charging server,
   receiving, by the policy and/or charging server, information relating to a user via the established control session from the policy enforcement function or the packet data gateway, wherein the information comprises an address of a service data detecting entity for detecting service data of an existing packet data connection of the user, wherein the existing packet data connection is established between the user and the policy enforcement function or the packet data gateway, and initiating, by the policy and/or charging server, communication towards the service data detecting entity based on the received information;
   wherein the method further comprises:
   transmitting, by the policy and/or charging server, a policy decision to the policy enforcement function or the packet data gateway.

18. A system comprising:
   a packet data entity configured to transmit to a policy and/or charging server information relating to a user, wherein the information comprises an address of a service data detecting entity for detecting service data of an existing packet data connection of the user, wherein the existing packet data connection is established between the user and the packet data entity,
   the policy and/or charging server being configured to transmit to the indicated service data detecting entity a request to initiate detection of service data of the existing packet data connection of the user, the policy and/or charging server being further configured to make a policy decision and to transmit the policy decision to the packet data entity, and
   the service data detecting entity being configured to detect service data of the exisiting packet data connection of the user.

* * * * *